United States Patent
Peeters et al.

(10) Patent No.: US 10,270,696 B2
(45) Date of Patent: *Apr. 23, 2019

(54) TRANSMISSION OF DATA PACKETS OF DIFFERENT PRIORITY LEVELS USING PRE-EMPTION

(75) Inventors: Miguel Peeters, Brussels (BE); Jean-Philippe Cornil, Enghien (BE)

(73) Assignee: Avago Technologies International Sales Pte. Limited, Singapore (SG)

( * ) Notice: Subject to any disclaimer, the term of this patent is extended or adjusted under 35 U.S.C. 154(b) by 1940 days.

This patent is subject to a terminal disclaimer.

(21) Appl. No.: 12/463,935

(22) Filed: May 11, 2009

(65) Prior Publication Data

US 2009/0219942 A1 Sep. 3, 2009

Related U.S. Application Data

(63) Continuation of application No. 11/003,740, filed on Dec. 6, 2004.

(Continued)

(51) Int. Cl.
| | |
|---|---|
| *H04L 12/28* | (2006.01) |
| *H04L 12/801* | (2013.01) |
| *H04L 12/24* | (2006.01) |
| *H04L 12/853* | (2013.01) |
| *H04L 12/851* | (2013.01) |
| *H04M 11/06* | (2006.01) |

(52) U.S. Cl.
CPC .......... *H04L 47/10* (2013.01); *H04L 41/0896* (2013.01); *H04L 47/245* (2013.01); *H04L 47/2416* (2013.01); *H04L 47/2441* (2013.01); *H04M 11/062* (2013.01); *H04L 41/5077* (2013.01)

(58) Field of Classification Search
CPC ......... H04W 74/0866; H04W 74/0875; H04W 74/0891
USPC ....... 370/351, 389, 392, 394, 412, 431, 464, 370/474, 532, 537
See application file for complete search history.

(56) References Cited

U.S. PATENT DOCUMENTS 5,557,608 A * 9/1996 Calvignac et al. ........... 370/389
6,438,135 B1 * 8/2002 Tzeng .......................... 370/412
(Continued)

OTHER PUBLICATIONS

IEEE Draft P802.3ah/D3.0, IEEE, Dec. 5, 2003, pp. 344-354.

*Primary Examiner* — Dmitry Levitan
(74) *Attorney, Agent, or Firm* — Sterne, Kessler, Goldstein & Fox P.L.L.C.

(57) ABSTRACT

A method for transmitting data packets of at least two different priority levels via one or more bearer channels is described. The method comprises the steps of fragmenting a data packet into a plurality of corresponding code words, each code word comprising a sync code, with the sync code being adapted for indicating a priority level of the corresponding data packet, and of transmitting the code words via the one or more bearer channels. In case high priority code words corresponding to a high priority data packet arrive during transmission of low priority code words corresponding to a low priority data packet, the following steps are performed: interrupting transmission of low priority code words, transmitting the high priority code words corresponding to the high priority data packet, and resuming the transmission of the low priority code words via the one or more bearer channels.

24 Claims, 4 Drawing Sheets

| Octet Name | Old Value | New Value |
|---|---|---|
| Sync Octet | $F0_{16} = [1\ 1\ 1\ 1\ 0\ 0\ 0\ 0]$ | $[1\ 1\ 1\ 1\ 0\ p_1\ p_2\ p_3]$ |
| | $0F_{16} = [0\ 0\ 0\ 0\ 1\ 1\ 1\ 1]$ | $[0\ 0\ 0\ 0\ 1\ \sim p_1\ \sim p_2\ \sim p_3]$ |
| Start Of Frame Octet (S) | $50_{16} = [1\ 0\ 0\ 1\ 0\ 0\ 0\ 0]$ | $[1\ 0\ 0\ 1\ 0\ p_1\ p_2\ p_3]$ |

Related U.S. Application Data

(60) Provisional application No. 60/527,003, filed on Dec. 5, 2003.

(56) References Cited

U.S. PATENT DOCUMENTS

| | | | |
|---|---|---|---|
| 6,876,669 B2* | 4/2005 | Shalom | 370/468 |
| 6,990,105 B1* | 1/2006 | Brueckheimer et al. | 370/395.5 |
| 7,006,500 B1* | 2/2006 | Pedersen et al. | 370/394 |
| 2002/0041595 A1* | 4/2002 | Delvaux | 370/392 |
| 2005/0129028 A1 | 6/2005 | Peeters et al. | |
| 2005/0188177 A1* | 8/2005 | Gao et al. | 712/1 |

* cited by examiner

| Sync octet | Octet fields 1 - 64 | | | | | | | | | |
|---|---|---|---|---|---|---|---|---|---|---|
| 1 → | $0F_{16}$ | $D_0$ | $D_1$ | $D_2$ | $D_3$ | $D_4$ | $D_5$ | ... | $D_{61}$ | $D_{62}$ | $D_{63}$ |
| 2 → | $F0_{16}$ | $C_k$ | $D_0$ | $D_1$ | $D_2$ | $D_3$ | ... | ... | Z | Z | Z |
| 3 → | $F0_{16}$ | $C_k$ | $D_0$ | ... | $D_{k-1}$ | Z | Z | $D_{k-1}$ | $D_0$ | ... | $D_{j-1}$ |
| 4 → | $F0_{16}$ | Z | Z | Z | Z | Z | S | Z | Z | Z | Z |
| 5 → | $F0_{16}$ | Z | Z | S | $D_0$ | $D_1$ | $D_2$ | ... | $D_{k-3}$ | $D_{k-2}$ | $D_{k-1}$ |
| 6 → | $F0_{16}$ | Y | Z | Z | Z | Z | ... | Z | Z | Z | Z |

Fig. 1

PRIOR ART

Fig. 4

| Octet Name | Old Value | New Value |
|---|---|---|
| Sync Octet | $F0_{16} = [11110000]$ | $[11110\ p_1 p_2 p_3]$ |
|  | $0F_{16} = [00001111]$ | $[00001\ {\sim}p_1 {\sim}p_2 {\sim}p_3]$ |
| Start Of Frame Octet (S) | $50_{16} = [10010000]$ | $[10010\ p_1 p_2 p_3]$ |

Fig. 5

| | Sync Octet | Payload Octets | | | | | | | | | |
|---|---|---|---|---|---|---|---|---|---|---|---|
| 19 → | $F0_{16}$ | Z | Z | $51_{16}$ | $D_0$ | $D_1$ | ... | $D_{58}$ | $D_{59}$ | $D_{60}$ | |
| 20 → | $0E_{16}$ | $D_0$ | $D_1$ | $D_2$ | $D_3$ | $D_4$ | ... | $D_{61}$ | $D_{62}$ | $D_{63}$ | |
| 21 → | $F2_{16}$ | $52_{16}$ | $D_0$ | $D_1$ | $D_2$ | $D_3$ | ... | $D_{60}$ | $D_{61}$ | $D_{62}$ | |
| 22 → | $F2_{16}$ | $C_k$ | $D_0$ | $D_1$ | $D_2$ | $D_3$ | ... | $D_{k-1}$ | Z | Z | |
| 23 → | $0E_{16}$ | $D_0$ | $D_1$ | $D_2$ | $D_3$ | $D_4$ | ... | $D_{61}$ | $D_{62}$ | $D_{63}$ | |
| 24 → | $F1_{16}$ | $C_k$ | $D_0$ | $D_1$ | $D_2$ | $D_3$ | ... | $D_{k-1}$ | Z | Z | |

Fig. 6

| | Sync Octet | Payload Octets | | | | | | |
|---|---|---|---|---|---|---|---|---|
| 25 → | $F2_{16}$ | $C_k$ | $D_0$ | ... | $D_{k-1}$ | Z | $53_{16}$ | $D_0$ | ... | $D_{j-1}$ |

Fig. 7

TRANSMISSION OF DATA PACKETS OF DIFFERENT PRIORITY LEVELS USING PRE-EMPTION

CROSS-REFERENCE TO RELATED APPLICATIONS

The application is a continuation of U.S. Non-Provisional patent application Ser. No. 11/003,740, filed Dec. 6, 2004, currently pending, which claims priority to U.S. Provisional Patent Application No. 60/527,003, entitled "Communication Link Having Quality of Service," filed Dec. 5, 2003, which are incorporated herein by reference in their entireties.

BACKGROUND OF THE INVENTION

Field of the Invention

The present invention relates to a method for transmitting data packets of at least two different priority levels via one or more bearer channels, and to a packet transport layer adapted for transmitting data packets via one or more bearer channels. The invention further relates to a packet transport layer adapted for receiving code words corresponding to data packets via one or more bearer channels.

Background Art

When transmitting data packets via a physical link of limited transmission rate, transmission of a first data packet might block the transmission of a subsequent second data packet until transmission of the first data packet has been completed. This "blocking" corresponds to a variable extra delay, which will further on be referred to as "jitter". The magnitude of this additional variable delay depends both on the link's data rate and on the size of the data packets.

There exist a variety of different applications that require a well-defined quality of service. For example, for an application such as voice over IP (VoIP), the end-to-end-delay of physical link must not exceed a predefined limit.

It is therefore an object of the present invention to transmit data packets via a physical link in accordance with a well-defined quality of service.

BRIEF SUMMARY OF THE INVENTION

The present invention provides a method for transmitting data packets of at least two different priority levels via one or more bearer channels, the method comprising the steps of fragmenting a data packet into a plurality of corresponding code words, each code word comprising a sync code, with the sync code being adapted for indicating a priority level of the corresponding data packet, and of transmitting the code words via the one or more bearer channels. In case high priority code words corresponding to a high priority data packet arrive during transmission of low priority code words corresponding to a low priority data packet, the following steps are performed: interrupting transmission of low priority code words, transmitting the high priority code words corresponding to the high priority data packet, and resuming the transmission of the low priority code words via the one or more bearer channels.

In one variant, high priority code words pre-empt transmission of low priority code words, with transmission of low priority code words being resumed after transmission of the high priority code words.

In another variant, after transmission of a last high priority code word, transmission of low priority code words is resumed as if it had not been interrupted.

In another variant, the method further comprises a step of routing the data packets, in dependence on their respective priority levels, to at least two service queues adapted for buffering data packets, each service queue being related to a certain priority level.

In one aspect, the sync code comprises at least one priority bit indicating a respective priority level of a corresponding data packet.

In one variant, transmission of a new data packet of different priority level may be started inside of a code word of the previous priority level, with a start of frame code indicating the beginning of the new data packet.

In another variant, in case a high priority code word corresponding to a high priority data packet pre-empts transmission of low priority code words corresponding to a low priority data packet, transmission of a currently transmitted low priority code word is completed, and starting at a next sync position, the high priority code word is transmitted.

In one aspect, the data packets are Ethernet frames.

In another aspect, the method further comprises a step of mapping priority bits of an Ethernet frame's VLAN tag to at least one of a sync code and a start of frame code of corresponding code words.

In another aspect, the code words are 64/65B code words according to the standard IEEE P802.3ah.

In one variant, the code words each comprise one sync octet and 64 octets adapted for transmitting payload, control codes, idle octets.

In yet another variant, at least some of the code words comprise start of frame codes indicating a beginning of a new data packet.

In one variant, the start of frame codes are adapted for indicating a priority level of the corresponding data packet.

In another aspect, the code words comprise code words of the type "all data" adapted for transmitting data octets of a corresponding data packet.

In yet another aspect, the code words comprise code words of the type "end of frame" adapted for transmitting a final part of a data packet followed by a plurality of idle octets.

In a further variant, the code words comprise code words of the type "start of frame while idle" adapted for transmitting a plurality of idle octets and a first part of a data packet.

In another aspect, the code words comprise code words of the type "start of frame while transmitting" adapted for transmitting a final part of a first data packet, a plurality of idle octets and a first part of a second data packet, wherein the first data packet and the second data packet may have different priority levels.

In one variant, the code words comprise code words of the type "all idle" adapted for transmitting idle octets.

In another variant, the code words comprise code words of the type "all idle out of sync" adapted for indicating a loss of synchronization.

In yet another variant, the one or more bearer channels are implemented as a set of bonded links.

In another aspect, the stream of code words is used for transmitting Ethernet frames via at least one xDSL loop.

The present invention provides a software program or product, preferably stored on a data carrier, for executing the above described method when said computer program product is executed on a computer, processing unit, digital signal processor, or the like.

The present invention further provides a packet transport layer adapted for transmitting data packets of at least two different priority levels via one or more bearer channels. The packet transport layer comprises a fragmentation unit adapted for fragmenting a data packet into a plurality of corresponding code words, each of the code words comprising a sync code, with the sync code being adapted for indicating a priority level of the corresponding data packet. The packet transport layer is adapted for interrupting transmission of low priority code words corresponding to a low priority data packet in case high priority code words corresponding to a high priority data packet arrive during transmission of the low priority code words, for transmitting the high priority code words, and for resuming the transmission of the low priority code words corresponding to the low priority data packet as soon as the high priority code words have been transmitted.

In one variant, the packet transport layer further comprises a plurality of service queues adapted for buffering data packets, with each service queue being related to a certain priority level.

In another variant, transmission of high priority code words corresponding to a high priority data packet is started at a next sync code position.

In one aspect, the packet transport layer further comprises a plurality of state machines, with each state machine being related to a certain priority level, said state machines being adapted for controlling transmission of code words that correspond to data packets of the respective priority level.

In one variant, upon presence of high priority code words, a low priority state machine related to low priority code words is delayed while the high priority code words are transmitted.

In another variant, after the last high priority code word has been transmitted, the low priority state machine is adapted for continuing transmission of low priority code words as if it had not been interrupted.

In another aspect, the fragmentation unit is adapted for fragmenting Ethernet frames into a plurality of corresponding 64/65B code words.

In yet another aspect, the packet transport layer is a TPS-TC layer.

The present invention further provides an xDSL transceiver comprising a packet transport layer as described above, said xDSL transceiver being adapted for transmitting the stream of code words via at least one xDSL loop.

Furthermore, the present invention provides a packet transport layer adapted for receiving code words corresponding to data packets via one or more bearer channels, each of the code words comprising a sync code, with the sync code indicating a respective priority level. The packet transport layer comprises a defragmentation unit adapted for reassembling, for each priority level, code words of a respective priority level, in order to regenerate corresponding data packets of the respective priority level. The packet transport layer further comprises a plurality of service queues, each service queue being adapted for buffering data packets of a respective priority level, and routing means adapted for routing regenerated data packets to a respective service queue according to their priority levels.

It is appreciated that these and other aspects of the invention will become apparent to those skilled in the art in the detailed description and drawings contained herein.

DETAILED DESCRIPTION OF THE INVENTION

The present invention provides a method for transmitting data packets of at least two different priority levels via one or more bearer channels, the method comprising the steps of fragmenting a data packet into a plurality of corresponding code words, each code word comprising a sync code, with the sync code being adapted for indicating a priority level of the corresponding data packet, and of transmitting the code words via the one or more bearer channels. In case high priority code words corresponding to a high priority data packet arrive during transmission of low priority code words corresponding to a low priority data packet, the following steps are performed: interrupting transmission of low priority code words, transmitting the high priority code words corresponding to the high priority data packet, and resuming the transmission of the low priority code words via the one or more bearer channels.

Hence, a code word related to a high-priority data packet may pre-empt the transmission of code words related to lower-priority data packets. The transmission of the lower-priority packet flow is interrupted, the higher priority code words are transmitted, and then, transmission of the lower priority data flow is continued at the point where it has been interrupted.

For implementing this interrupt-and-resume-technique, which will furtheron be referred to as "pre-emption", the sync code of a respective code word has to indicate a respective priority level of the data packet the code word corresponds to. The priority levels of two code words that await transmission are compared, and the higher-priority code word may pre-empt transmission of the lower-priority code word. The invention might e.g. be implemented by slightly modifying the code words' sync codes. Backward compatibility to existing standard definitions is ensured.

One advantage of embodiments of the present invention is that code words related to high-priority data packets can be transmitted immediately. In dependence on the respective priority level assigned to a code word, the variable delay due to jitter can be considerably reduced, and the quality-of-service requirements of applications like e.g. Voice over IP can be fulfilled.

Whenever high-priority traffic and low-priority traffic are transmitted via one bearer channel, the total bandwidth has to be assigned to the different types of traffic. The "pre-emption" technique as described herein allows to adapt the part of the total bandwidth that is used for high-priority traffic according to the respective needs in a very flexible way. For example, if there is no high-priority traffic at all, all the available bandwidth of the physical link will be used for transmitting low-priority traffic. However, as soon as there are high-priority code words that await transmission, a large part of the total bandwidth will be used for transmitting the high-priority code words.

In this regard, the present solution is superior to any solution that allocates a fixed fraction of the total bandwidth to the high-priority and the low-priority traffic, respectively. When segmenting the physical link into a high-priority link and a low-priority link, the bandwidth allocated to the high-priority channel is permanently lost to the main (or low-priority) channel. Hence, both in terms of latency and throughput, embodiments of the present invention are superior to any kind of physical layer segmentation.

Preferably, the method further comprises a step of routing the data packets, in dependence on their respective priority levels, to at least two service queues adapted for buffering data packets, each service queue being related to a certain priority level. A data packet of a high priority service queue is transmitted with low latency, whereas a data packet in a low priority queue might have to wait until code words corresponding to high priority data packets have been transmitted. The service queues might e.g. be realized as FiFo buffers.

Preferably, the sync code comprises at least one priority bit indicating a respective priority level of a corresponding data packet. This can be accomplished by slightly modifying existing sync code definitions.

Further preferably, transmission of a new data packet of different priority level may be started inside of a code word of the previous priority level, with a start of frame code indicating the beginning of the new data packet. Thus, throughput is improved by reducing the number of idle bytes transmitted via the link.

According to an alternatively preferred embodiment, in case a high priority code word corresponding to a high priority data packet pre-empts transmission of low priority code words corresponding to a low priority data packet, transmission of a currently transmitted low priority code word is completed, and starting at a next sync position, the high priority code word is transmitted. In this embodiment, the start of a new data packet coincides with the start of a new code word. As a consequence, each code word only comprises data of one well-defined priority level.

According to a preferred embodiment, the data packets are Ethernet frames. Ethernet frames are variable size data packets comprising up to 1500 bytes of data. Because of their large size, the delay due to jitter is non-negligible.

Preferably, the method further comprises a step of mapping priority bits of an Ethernet frame's VLAN tag to at least one of a sync code and a start of frame code of corresponding code words. The VLAN tag comprises three priority bits indicating the Ethernet frame's priority level. These priority bits can be used for indicating the respective priority level of code words corresponding to said Ethernet frame.

Preferably, the code words are 64/65B code words according to the standard IEEE P802.3ah. A 65 byte code word according to the standard 64/65B comprises 64 bytes of payload. Due to the small amount of overhead, 64/65B code words are often used for transmitting large data packets via a physical link.

According to a preferred embodiment of the invention, the one or more bearer channels are implemented as a set of bonded links. According to this embodiment, the bonded links are treated as one physical link of a certain bandwidth, whereby high priority code words may pre-empt the transmission of low priority code words. As long as there is no high priority traffic, the entire bandwidth of the set of bonded links can be used for transmitting low priority traffic.

Preferably, the stream of code words is used for transmitting Ethernet frames via at least one xDSL loop. Pre-emption allows realizing different QoS levels for different types of Ethernet traffic transmitted via one or more xDSL loops.

The present invention further provides a packet transport layer adapted for transmitting data packets of at least two different priority levels via one or more bearer channels. The packet transport layer comprises a fragmentation unit adapted for fragmenting a data packet into a plurality of corresponding code words, each of the code words comprising a sync code, with the sync code being adapted for indicating a priority level of the corresponding data packet. The packet transport layer is adapted for interrupting transmission of low priority code words corresponding to a low priority data packet in case high priority code words corresponding to a high priority data packet arrive during transmission of the low priority code words, for transmitting the high priority code words, and for resuming the transmission of the low priority code words corresponding to the low priority data packet as soon as the high priority code words have been transmitted.

According to a preferred embodiment, the packet transport layer further comprises a plurality of state machines, with each state machine being related to a certain priority level, said state machines being adapted for controlling transmission of code words that correspond to data packets of the respective priority level. Each of the state machines is adapted for controlling the transmission of code words related to its respective priority level, whereby a state machine related to high priority data flow may interrupt a transmission controlled by a lower priority state machine.

Preferably, upon presence of high priority code words, a low priority state machine related to low priority code words is delayed while the high priority code words are transmitted. As soon as the high priority code words have been transmitted, the low priority state machine can continue transmission of low priority traffic at the point where it has been interrupted.

According to a preferred embodiment, after the last high priority code word has been transmitted, the low priority state machine is adapted for continuing transmission of low priority code words as if it had not been interrupted. In this embodiment, the available bandwidth is utilized as efficiently as possible.

The present invention further provides an xDSL transceiver comprising a packet transport layer as described above, said xDSL transceiver being adapted for transmitting the stream of code words via at least one xDSL loop. Thus, when transmitting large data packets via an xDSL loop, predefined quality-of-service levels can be met.

Furthermore, the present invention provides a packet transport layer adapted for receiving code words corresponding to data packets via one or more bearer channels, each of the code words comprising a sync code, with the sync code indicating a respective priority level. The packet transport layer comprises a defragmentation unit adapted for reassembling, for each priority level, code words of a respective priority level, in order to regenerate corresponding data packets of the respective priority level. The packet transport layer further comprises a plurality of service queues, each service queue being adapted for buffering data packets of a respective priority level, and routing means adapted for routing regenerated data packets to a respective service queue according to their priority levels.

An Ethernet frame is a variable size data packet comprising up to 1500 bytes of payload. When transmitting an Ethernet frame via a bearer channel, e.g. via an xDSL loop, the Ethernet frame has to be fragmented into small packets, and these packets are transmitted in accordance with a packet transmission mode (PTM). Two packet transmission modes have been defined for transporting Ethernet frames over xDSL. The first mode is based on an HDLC (High Level Data Link Control) framing and can be found in ITU-T recommendation G.992.3. The second mode is based on the 64/65B encapsulation as described in IEEE draft P802.3ah/D2.2. According to this standard, an Ethernet frame is segmented into a series of 64/65B code words, with each of the 64/65B code words comprising a sync octet and 64 octet fields. Thus, 64/65B code words only comprise one octet overhead per 64 octets of payload, which means that the amount of overhead is very small.

Figure 1:
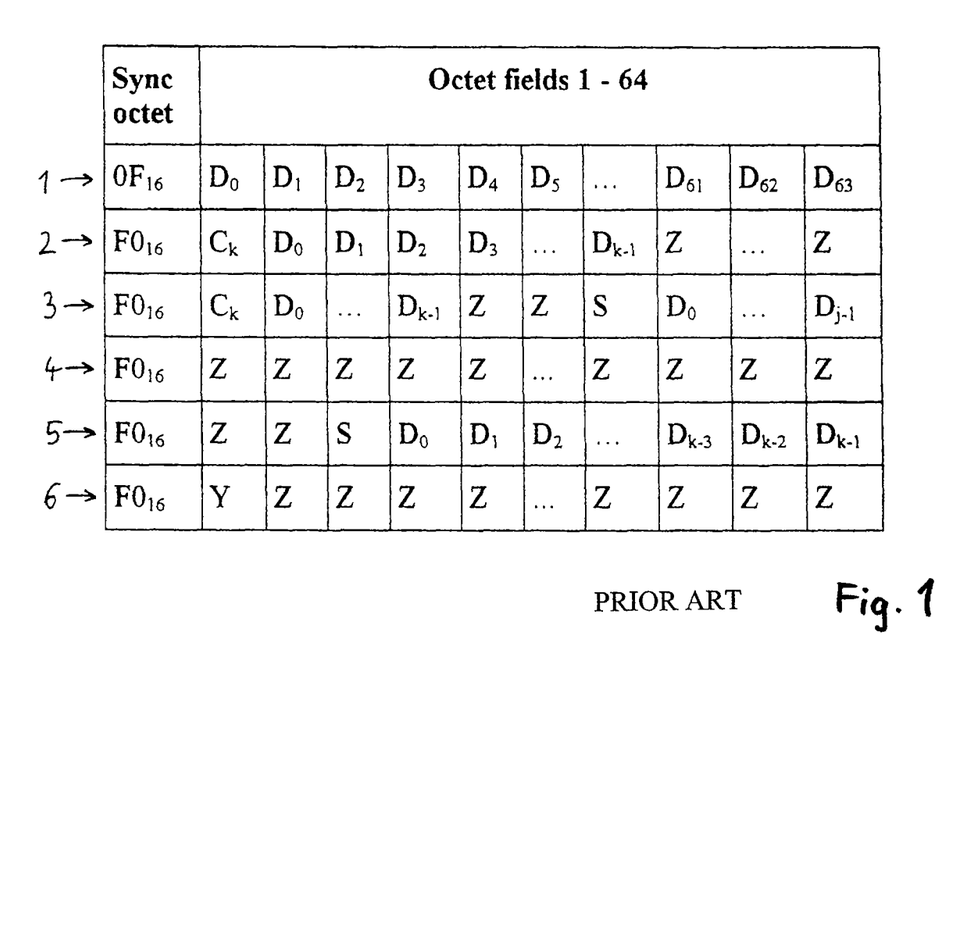
FIG. 1 shows basic code word formats for data transmission according to the standard 64/65B.

FIG. 1 shows a plurality of basic code word types for 64/65B encapsulation. Code word 1 is a code word of the "all data" type, which is characterized by an all data sync $0F_{16}$ in the sync position. The all data sync $0F_{16}$ indicates that 64 byte of frame data $D_0$ to $D_{63}$ will follow, whereby the data bytes relate to one single Ethernet frame.

Code word 2 is of the "end of frame" type, which is used for transmitting a last fragment of an Ethernet frame comprising less than 64 data bytes. A sync octet $F0_{16}$ is followed by a character $C_k$, $0 \leq k \leq 63$, indicating that k data bytes $D_0$ to $D_{k-1}$ will follow. The character $C_k$ is defined as $C_k = k + 10_{16}$, whereby the Most Significant Bit (MSB) is set so that the resulting value has even parity: $C_0 = 90_{16}$, $C_1 = 11_{16}$, $C_2 = 12_{16}$, $C_3 = 93_6$, ... $C_{62} = 43_{16}$, $C_{63} = CF_{16}$. The octet fields comprise data bytes $D_0$ to $D_{k-1}$, and the remaining octet fields are filled with (63-k) idle bytes Z.

Code word 3 is of the type "start of frame while transmitting" and comprises a last part of a first Ethernet frame followed by a first part of a second Ethernet frame. A sync octet $F0_{16}$ is followed by a control character $C_k$. The control character $C_k$ indicates that there are k remaining data bytes of the first Ethernet frame, with $0 \leq k \leq 62$. After the k data bytes $D_0$ to $D_{k-1}$ have been transmitted, (62-k-j) idle bytes Z are transmitted. The start of the second Ethernet frame is indicated by means of a start of frame octet S, which is typically defined as $50_{16}$. After the start of frame octet S, the first j data octets $D_0$ to $D_{j-1}$ of the second Ethernet frame are transmitted, with $0 \leq j \leq (62-k)$.

The code word 4 shown in FIG. 1 is an "all idle" code word that does not contain any data bytes. A sync octet $F0_{16}$ in the code word's sync position is followed by 64 idle bytes Z.

Code word 5 is of the type "start of frame while idle" and is used for transmitting a first part of an Ethernet frame. A sync octet $F0_{16}$ is followed by (63-k) idle bytes Z. The start of the new frame is indicated by a start of frame octet S, which is followed by k data bytes $D_0$ to $D_{k-1}$, with $0 \leq k \leq 63$.

In the last row of FIG. 1, a code word 6 of the type "all idle out-of sync" is shown, which indicates a loss of synchronization. The "all idle out-of sync" code word 6 comprises a sync octet $F0_{16}$, followed by a control character Y, which might e.g. be set to $D1_{16}$, and by 63 idle octets Z.

In solutions of the prior art, Ethernet frames have been transmitted in sequential order via a bearer channel. This might imply that code words related to a new Ethernet frame might have to wait until the transmission of code words related to a previous Ethernet frame has been completed. An Ethernet packet may arrive at the link layer when the link is idle or it could arrive just as another Ethernet packet is starting to be transmitted, forcing it to wait for the other packet to be transmitted. Hence, the total time required for transmitting an Ethernet frame will be equal to the sum of an actual transmission time ("fly time") plus an extra time delay varying between 0 and the time taken for completing transmission of a previous Ethernet frame. This extra time delay is often referred to as jitter and has the effect of increasing the lowest guaranteed latency of the link.

Figure 2:
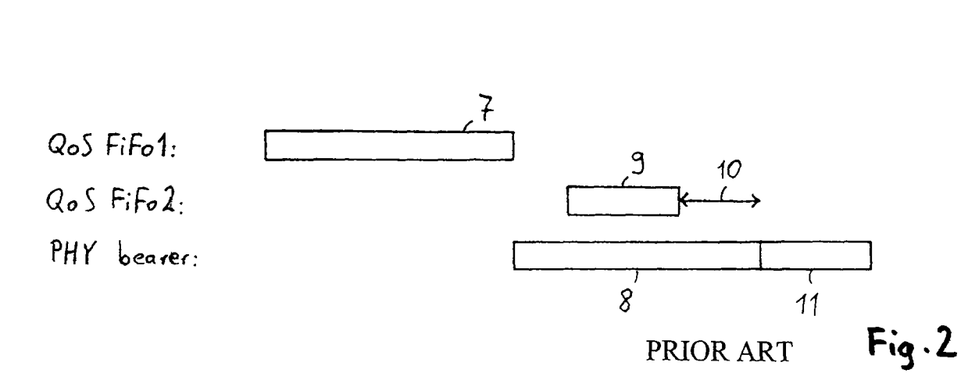
FIG. 2 illustrates the effect of jitter when transmitting Ethernet frames.

FIG. 2 shows a sequential transmission of two Ethernet frames via a bearer channel according to the prior art. A first Ethernet frame 7 buffered in a QoS FiFo1 is transmitted (8) via the PHY bearer. During the transmission of the first Ethernet frame, a second Ethernet frame 9 arrives, which is buffered in QoS FiFo2. The transmission of the second Ethernet frame 9 is postponed until the transmission of the first Ethernet frame 8 has been completed. This extra delay is referred to as jitter 10. After the transmission 8 of the first Ethernet frame is finished, the second Ethernet frame 9 is transmitted (11). With regard to the second Ethernet frame, the total transmission delay comprises the jitter 10 and the transmission time required for transmitting the second Ethernet frame 9. Due to the Ethernet packets' large size of up to 1500 bytes, jitter may have a considerable impact on the total transmission delay. Various applications, like e.g. Voice over IP (VoIP) require that latency is limited on an end-to-end basis.

For this purpose, it is proposed to transmit frame segments related to different Ethernet frames in an interleaved mode via a bearer channel. Furthermore, priority levels might be assigned to different Ethernet frames, whereby code words related to a high-priority Ethernet frame may pre-empt the transmission of code words related to a low-priority Ethernet frame.

Figure 3:
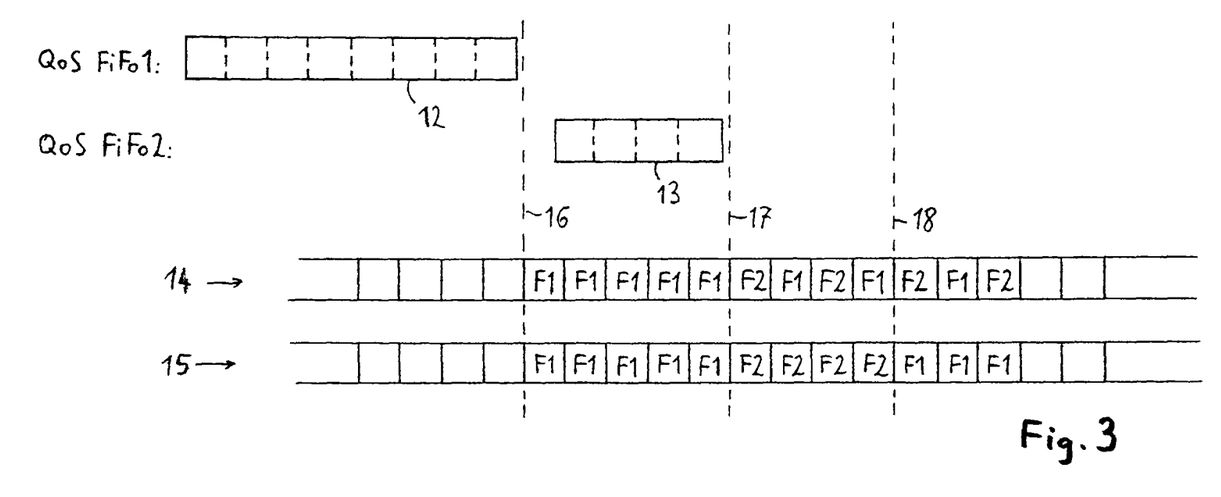
FIG. 3 illustrates interleaved transmission of Ethernet frames according to the present invention.

FIG. 3 shows the transmission of two different Ethernet frames via one PHY bearer according to embodiments of the present invention. A first Ethernet frame 12 is buffered in QoS FiFo1. Then, a second Ethernet frame 13 is received, which is buffered in QoS FiFo2. Below the two Ethernet frames 12, 13, two different sequences 14, 15 of code words transmitted via the PHY bearer are shown. In the upper sequence 14 of code words, starting at a point of time 16, code words F1 related to the first Ethernet frame 12 are transmitted. At a point of time 17, the second Ethernet frame 13 has arrived, and accordingly, code words F2 related to the second Ethernet frame 13 are interleaved with code words F1 related to the first Ethernet frame 12. In the sequence 14, the transmission of code words F2 related to the second Ethernet frame 13 can be started before the transmission of Ethernet frame 12 is completed, and hence, jitter is reduced.

The lower sequence 15 of code words corresponds to a case where different priority levels have been assigned to the two Ethernet frames, with the priority level assigned to the second Ethernet frame 13 being higher than the priority level of the first Ethernet frame 12. Starting at the point of time 16, code words F1 related to the first Ethernet frame 12 are transmitted. At the point of time 17, the high-priority Ethernet frame 13 is available. Now, the transmission of high-priority code words F2 pre-empts the transmission of low-priority code words F1. This means that the transmission of code words F1 is suspended, all the code words F2 related to the second Ethernet frame 13 are transmitted, and then, at a point of time 18, transmission of the low-priority code words F1 is resumed. As a result, the high-priority Ethernet frame 13 can be transmitted without any additional delay. Due to this priority-based arbitration of the bearer channel's bandwidth, which will furtheron be referred to as "pre-emption", the high-priority Ethernet frame 13 can be transmitted as quickly as possible.

In order to indicate the respective priorities, it is proposed to modify the control characters of the 64/65B encapsulation in a way that they indicate respective priority levels of the code words. Ethernet frames comprise a VLAN (Virtual Local Area Network) tag including three priority bits. According to a solution shown in FIG. 4, the three priority bits of the Ethernet VLAN tag can be mapped to the sync octet. Furthermore, the three priority bits might optionally be mapped to the start of frame flags.

Figures 4, 5:
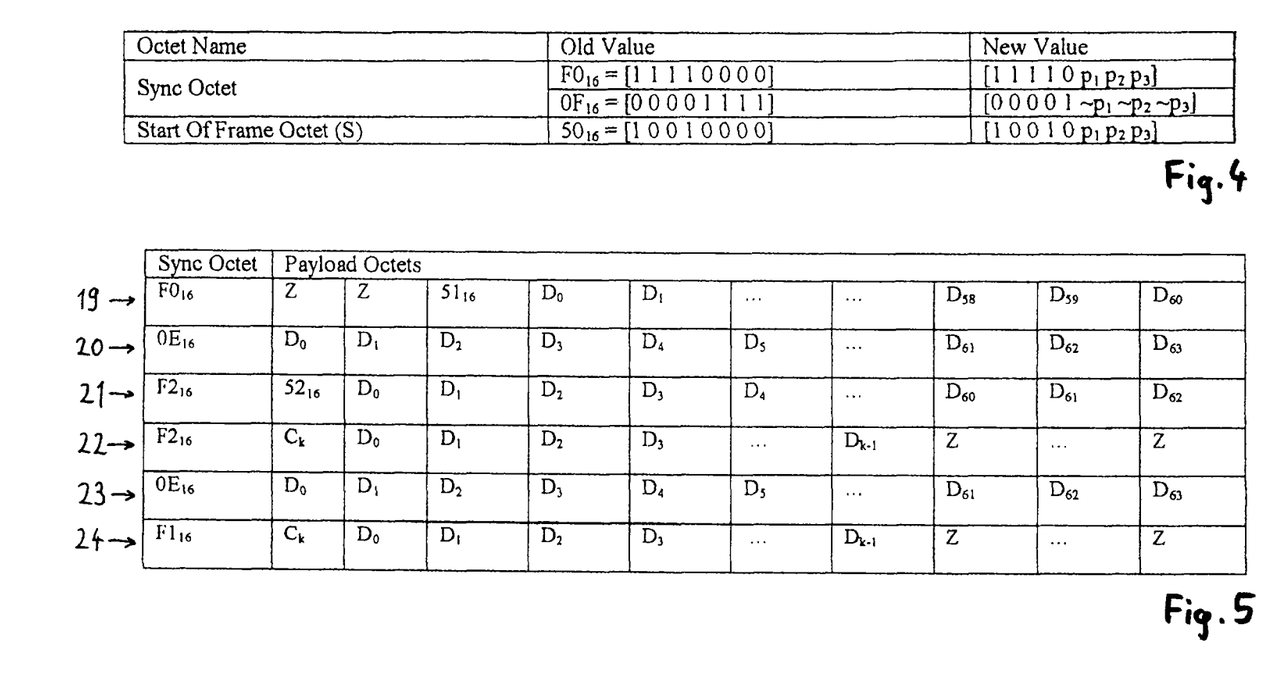
FIG. 4 gives a set of modified control characters indicating respective priority levels of the transmitted payload.
FIG. 5 illustrates how high-priority code words may pre-empt the transmission of lower-priority code words.

In FIG. 4, both the old values and the new values of the respective control characters are shown. The sync octet $F0_{16}$=[1 1 1 1 0 0 0 0], which is used for all types of code words except "all data", is replaced by a new value [1 1 1 1 0 $p_1$ $p_2$ $p_3$], with $p_1$, $p_2$, $p_3$ denoting the three priority bits of the VLAN tag as defined in IEEE standard 802.1t. The priority bits $p_1$, $p_2$, $p_3$ encode the respective priority level of an Ethernet frame, with a large value of the triplet [$p_1$ $p_2$ $p_3$] indicating a high priority of the respective Ethernet frame. The sync octet $0F_{16}$=[0 0 0 0 1 1 1 1], which is used for code words of the type "all data", is replaced by the new value [0 0 0 0 1 ~$p_1$, ~$p_2$, ~$p_3$], with ~$p_1$, ~$p_2$, ~$p_3$ denoting inverted priority bits. Furthermore, the start of frame octet S, which indicates the beginning of a new Ethernet frame, might be modified as well. The former value $50_{16}$=[1 0 0 1 0 0 0 0] is replaced by a new value [1 0 0 1 0 $p_1$ $p_2$ $p_3$]. The modified start of frame octet S indicates the subsequent Ethernet frame's priority level.

The set of modified control characters are adapted for indicating a respective priority level of a code word's payload. With regard to the modified control characters, backward compatibility to existing 64/65B encapsulation is ensured.

Instead of 8 different priority levels, a smaller number of priority levels might be employed. Furthermore, dependant on the available number of priority bits, a higher number of priority levels might be utilized. An Ethernet frame of higher priority may interrupt transmission of a low-priority frame, no matter how many priority levels have been defined.

FIG. 5 shows an example of a sequence of code words, whereby transmission of a priority 1 frame is interrupted by a frame of priority 2. Initially, a code word 19 of the type "start of frame while idle" is transmitted. The code word's sync octet $F0_{16}$ corresponds to priority 0, because at this point of time, transmission of the frame 1 has not started yet. Next, two idle octets Z are transmitted, and then, a start of frame octet $51_{16}$ indicating the start of a priority 1 frame is sent. Then, in octets $D_0$ to $D_{60}$ of code word 19, the first part of frame 1 is transmitted.

The following code word 20 is a code word of the type "all data". The code word 20 comprises a sync octet $0E_{16}$ indicating payload of priority 1. The code word 20 further comprises 64 data octets $D_0$ to $D_{63}$ transmitting payload of frame 1.

After transmission of code word 20, there is a frame of priority 2 that waits for being transmitted. Accordingly, the transmission of frame 1 is interrupted, and a code word 21 of the type "start of frame while idle" is generated, in order to transmit the payload of the priority 2 frame. The sync octet $F2_{16}$ indicates payload of priority 2. Next, a start of frame octet $52_{16}$ is sent, which is followed by the first 63 data bytes $D_0$ to $D_{62}$ of frame 2.

In the following code word 22, the remaining part of frame 2 is transmitted. Code word 22 is a code word of the type "end of frame". Code word 22 comprises a sync octet $F2_{16}$, followed by a control character $C_k$ indicating that k data bytes $D_0$ to $D_{k-1}$ of frame 2 will follow. The control character $C_k$ might e.g. be defined as described with regard to the above FIG. 1.

Now, the transmission of Ethernet frame 2 is completed, and accordingly, the transmission of Ethernet frame 1 is resumed. For this purpose, a code word 23 of the type "all data" is sent, whereby the transmission of frame 1 is continued with the data byte following the last data byte $D_{63}$ of code word 20. Code word 23 comprises a sync octet $0E_{16}$ indicating payload of priority 1, and a sequence of 64 data bytes $D_0$ to $D_{63}$ of frame 1. For transmitting the remaining bytes of frame 1, a code word 24 of the type "end of frame" is sent. Code word 24 comprises a sync octet $F1_{16}$ indicating payload of priority 1. Then, a control character $C_k$ is transmitted, followed by k data bytes $D_0$ to $D_{k-1}$ of frame 1. The rest of code word 24 is filled with idle octets Z.

Figure 6:
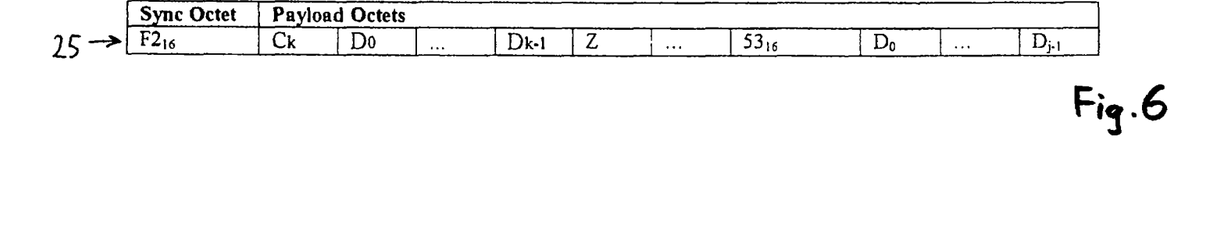
FIG. 6 illustrates the start of a priority 3 frame while transmitting a priority 2 frame.

The priority level of data bytes is indicated both by the sync octets and by the start of frame octets S. This implies that transmission of a higher priority Ethernet frame may be started within a low priority code word. An example for this situation is shown in FIG. 6. Code word 25 is a code word of the type "start of frame while transmitting". First, a last part of a priority 2 Ethernet frame is transmitted. Therefore, the sync octet $F2_{16}$ indicates a priority 2 payload. The octet $C_k$ indicates that k data bytes $D_0$ to $D_{k-1}$ of the priority 2 Ethernet frame will follow. The code word 25 further comprises one or more idle bytes Z. Within the code word 25, transmission of a priority 3 Ethernet frame is started. The start of frame octet $53_{16}$ indicates the start of priority 3 data. Subsequently, the first j data bytes $D_0$ to $D_{j-1}$ of the priority 3 Ethernet frame are transmitted. The implementation shown in FIG. 6 allows for an efficient use of the code word's capacity. However, one might as well employ an alternative implementation, whereby a start of a new Ethernet frame coincides with a new code word. In this case, the remaining octets of a previous code word are filled with idle bytes Z.

The present invention can be used for transmitting Ethernet packets via an xDSL bearer channel. However, the invention is not limited to the case of xDSL links, but can be used for any kind of physical link.

Figure 7:
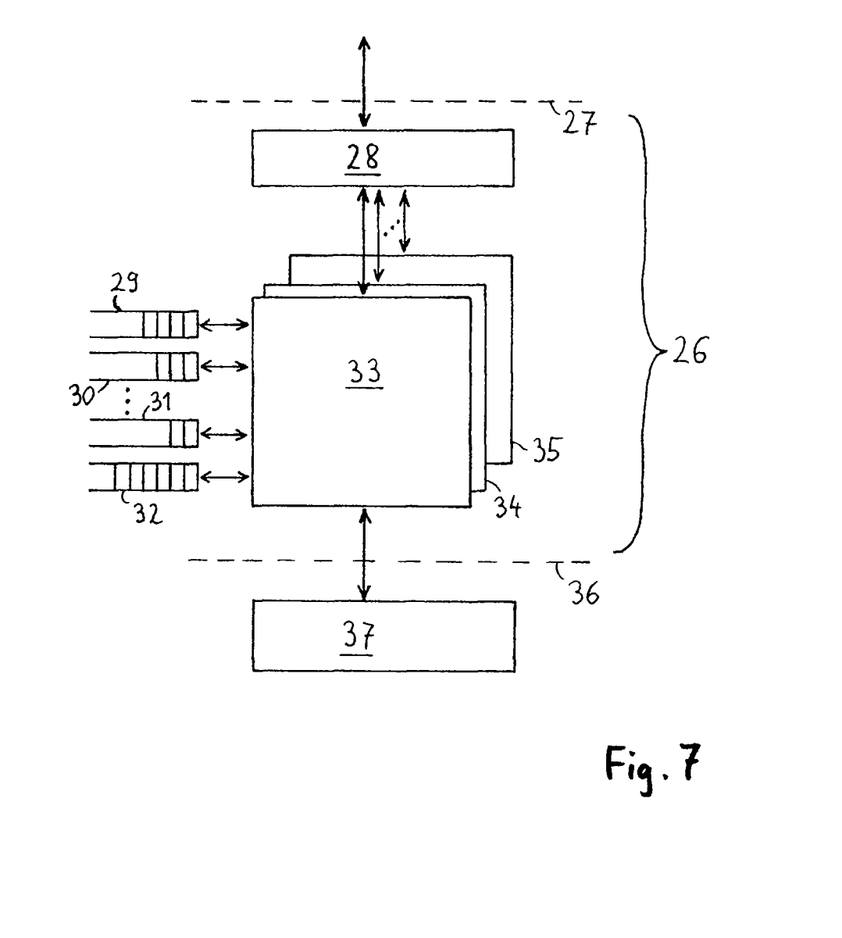
FIG. 7 depicts the structures of a TPS-TC layer adapted for converting Ethernet frames into corresponding 64/65B code words.

In FIG. 7, a structure of a Transport Protocol Specific-Transmission Convergence (TPS-TC) layer 26 according to the present invention is shown. The TPS-TC layer 26 comprises an interface 27 adapted for receiving Ethernet packets. The Ethernet packets are passed to a VLAN switching unit 28 adapted for routing the Ethernet frames, in accordance with their VLAN priority bits $p_1$, $p_2$, $p_3$, to a plurality of service queues 29, 30, 31, 32. For each priority level, a separate service queue is provided, with the service queue being adapted for buffering Ethernet frames of a respective priority level. The TPS-TC layer 26 further comprises, for each priority level, a corresponding state machine 33, 34, 35. Each of the state machines 33, 34, 35 is adapted for converting an Ethernet frame obtained from a corresponding one of the service queues 29-32 into a sequence of 64/65B code words. The code words generated by the state machines 33, 34, 35 are forwarded, via an interface 36, to a Physical Media Dependent (PMD) layer 37, whereby code words generated by a high-priority state machine may pre-empt the transmission of lower-priority code words. Whenever code words of high priority are generated, the state machines related to lower priorities are delayed. Transmission of the low-priority code words is resumed as soon as the higher-priority code words have been transmitted. Thus, code words of higher priority may pre-empt the transmission of lower-priority code words.

What is claimed is:

1. A method for transmitting frames of at least two different priority levels via one or more bearer channels, comprising:
   buffering, by a plurality of service queues, a plurality of low priority frames and a plurality of high priority frames, each service queue from among the plurality of service queues corresponding to different priority levels;
   fragmenting a low priority frame from among the plurality of low priority frames into a plurality of low priority code words, each low priority code word in the plurality of low priority code words comprising a sync code from among a plurality of sync codes, the sync code being configured to indicate a priority level of the low priority frame;
   mapping a priority bit of the low priority frame to at least one of the plurality of sync codes;
   transmitting the plurality of low priority code words via the one or more bearer channels after the fragmenting and prior to transmitting a high priority code word;
   wherein in case the high priority code word corresponding to a high priority frame from among the plurality of high priority frames arrives during transmission of the plurality of low priority code words, the following is performed:
   interrupting the transmission of the plurality of low priority code words,
   transmitting the high priority code word corresponding to the high priority frame, and
   resuming the transmission of the plurality of low priority code words via the one or more bearer channels after the transmission of the high priority code word.

2. The method of claim 1, further comprising:
   routing the low priority frame, in dependence on the priority level, to a service queue from among a plurality of service queues corresponding to different priority levels, the service queue corresponding to the priority level.

3. The method of claim 1, wherein the sync code comprises:
   at least one priority bit indicating the priority level.

4. The method of claim 1, further comprising:
   starting transmission of a second plurality of low priority code words corresponding to a second low priority frame of a second priority level that is different from the priority level,
   wherein at least one low priority code word from among the second plurality of low priority code words comprises:
   a start of frame code indicating a beginning of the second low priority frame.

5. The method of claim 1, further comprising:
   completing transmission of a low priority code word from among the plurality of low priority code words when the high priority code word arrives during transmission of the plurality of low priority code words, and wherein the transmitting the high priority code word comprises:
   transmitting the high priority code word at a next sync position.

6. The method of claim 1, wherein at least one low priority code word from among the plurality of low priority code words comprises:
   one sync octet, octets adapted for transmitting payload, control codes, and idle octets.

7. The method of claim 1, wherein at least one low priority code word from among the plurality of low priority code words comprises:
   a start of frame code indicating a beginning of the low priority frame.

8. The method of claim 7, wherein the start of frame code is configured to indicate the priority level.

9. The method of claim 1, wherein at least one low priority code word from among the plurality of low priority code words is of the type "all data" adapted for transmitting data octets of the low priority frame.

10. The method of claim 1, wherein at least one low priority code word from among the plurality of low priority code words is of the type "end of frame" adapted for transmitting a final part of the low priority frame followed by a plurality of idle octets as the at least one low priority code word.

11. The method of claim 1, wherein at least one low priority code word from among the plurality of low priority code words is of the type "start of frame while idle" adapted for transmitting a plurality of idle octets and a first part of the low priority frame as the at least one low priority code word.

12. The method of claim 1, wherein at least one low priority code word from among the plurality of low priority code words is of the type "start of frame while transmitting" adapted for transmitting a final part of the low priority frame, a plurality of idle octets, and a first part of the high priority frame as the at least one low priority code word.

13. The method of claim 1, wherein at least one low priority code word from among the plurality of low priority code words is of the type "all idle" adapted for transmitting idle octets as the at least one low priority code word.

14. The method of claim 1, wherein at least one low priority code word from among the plurality of low priority code words is of the type "all idle out of sync" adapted for indicating a loss of synchronization as the at least one low priority code word.

15. The method of claim 1, further comprising:
    implementing the one or more bearer channels as a set of bonded links.

16. The method of claim 1, wherein the transmitting the plurality of low priority code words comprises:
    transmitting the plurality of low priority code words via a digital subscriber line loop.

17. The method of claim 1, further comprising:
    dynamically allocating bandwidth on the one or more bearer channels according to the priority level.

18. A packet transport layer for receiving code words corresponding to frames via one or more bearer channels, each of the code words comprising a sync code, the sync code indicating a respective priority level, comprising:
    a defragmentation unit configured to reassemble, for each priority level, code words of a respective priority level to regenerate a corresponding frame of the respective priority level;
    a plurality of service queues, each service queue being configured to buffer frames of a corresponding priority level from among a plurality of priority levels, the respective priority level being from among the plurality of priority levels; and
    routing means configured to route a regenerated frame to a respective service queue from among the plurality of service queues according to the respective priority level.

19. A transceiver for transmitting frames of at least two different priority levels via one or more bearer channels, the transceiver comprising:

a plurality of service queues configured to buffer a plurality of low priority frames and a plurality of high priority frames, each service queue from among the plurality of service queues corresponding to different priority levels;

a memory that stores a software program; and a processor configured to execute the software program, the software program, when executed by the processor, configuring the processor to:

fragment a frame into a plurality of code words prior to transmission, each code word in the plurality of code words comprising a sync code from among a plurality of sync codes, the sync code being configured to indicate a priority level of the frame;

map a priority bit of the frame to the plurality of sync codes, interrupt transmission of a plurality of low priority code words corresponding to a low priority frame from among the plurality of low priority frames in case a high priority code word corresponding to a high priority frame from among the plurality of high priority frames arrives during transmission of the plurality of low priority code words, transmit the high priority code word, and resume the transmission of the plurality of low priority code words corresponding to the low priority frame after the high priority code word has been transmitted.

20. The transceiver of claim 19, wherein the software program, when executed by the processor, configures the processor to transmit the high priority code word starting at a next sync code position.

21. The transceiver of claim 19, wherein the processor comprises:

a plurality of state machines, with each state machine from among the plurality of state machines corresponding to a certain priority level and configured to control transmission of code words that correspond to frames of the certain priority level.

22. The transceiver of claim 21, wherein upon presence of the high priority code word, a low priority state machine corresponding to low priority code words from among the plurality of state machines is configurable to be delayed while the high priority code word is transmitted.

23. The transceiver of claim 21, wherein the high priority code word is from a plurality of high priority code words, and wherein the plurality of state machines comprises:

a low priority state machine configured to continue transmission of the plurality of low priority code words after a last high priority code word from among the plurality of high priority code words has been transmitted.

24. The transceiver of claim 19, wherein the software program, when executed by the processor, configures the processor to fragment the frame into a plurality of corresponding 64/65B code words.

* * * * *